(12) United States Patent
Heerdt et al.

(10) Patent No.: US 7,150,559 B1
(45) Date of Patent: Dec. 19, 2006

(54) HOT MELT ADHESIVE DETECTION METHODS AND SYSTEMS

(75) Inventors: Dieter B. Heerdt, Gallatin, TN (US); Paul M. Jenkins, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 321 days.

(21) Appl. No.: 10/356,771

(22) Filed: Feb. 1, 2003

Related U.S. Application Data

(63) Continuation-in-part of application No. 10/254,316, filed on Sep. 25, 2002.

(51) Int. Cl.
G01K 3/00 (2006.01)
G01J 5/00 (2006.01)

(52) U.S. Cl. ...................... 374/110; 374/121

(58) Field of Classification Search ............... 374/121, 374/4, 45, 53, 129, 124, 110, 115, 120, 137, 374/100, 141; 156/64, 351, 356, 357, 378, 156/379, 359; 118/665, 667, 669; 250/349, 250/342; 427/8–10; 702/81, 82, 172, 134, 702/135
See application file for complete search history.

(56) References Cited

U.S. PATENT DOCUMENTS

| | | | | |
|---|---|---|---|---|
| 3,100,097 A | * | 8/1963 | Woltersdorf | 246/169 D |
| 3,539,807 A | * | 11/1970 | Bickel | 250/338.1 |
| 3,618,386 A | * | 11/1971 | Black | 374/115 |
| 3,667,846 A | | 6/1972 | Nater et al. | |
| 4,044,250 A | | 8/1977 | Fetzer | |
| 4,109,508 A | * | 8/1978 | Fukuyama | 374/5 |
| 4,215,939 A | | 8/1980 | Miller | |
| 4,355,760 A | * | 10/1982 | Ruby | 236/47 |
| 4,439,049 A | * | 3/1984 | Hoogendoorn et al. | 374/124 |
| 4,458,152 A | | 7/1984 | Bonora | |
| 4,602,872 A | * | 7/1986 | Emery et al. | 374/152 |
| 4,626,389 A | * | 12/1986 | Lempfer et al. | 264/40.7 |
| 4,704,603 A | | 11/1987 | Edwards et al. | |
| 4,831,258 A | | 5/1989 | Paulk et al. | |
| 4,955,727 A | * | 9/1990 | Weiss | 374/124 |
| 5,081,359 A | * | 1/1992 | Pompei | 250/349 |
| 5,220,169 A | | 6/1993 | Ninomiya et al. | |
| 5,319,202 A | | 6/1994 | Pompei | |
| 5,323,005 A | * | 6/1994 | Merkel | 250/338.1 |
| 5,438,233 A | | 8/1995 | Boland et al. | |
| 5,582,663 A | * | 12/1996 | Matsunaga | 156/64 |

(Continued)

FOREIGN PATENT DOCUMENTS

DE 19750862 4/1988

(Continued)

OTHER PUBLICATIONS

LQ-Series Laser Module, WSTech (Product Brochure) 1999, (1 page).

(Continued)

Primary Examiner—Diego Gutierrez
Assistant Examiner—Mirellys Jagan
(74) Attorney, Agent, or Firm—Donald J. Breh; Mark W. Croll; Lisa M. Soltis

(57) ABSTRACT

A hot melt adhesive sensing system and methods including detecting (410) multiple areas of a target, for example a hot adhesive material, by sensing changes in temperature with a corresponding number of thermal sensors, summing (420) an output of the thermal sensors, and evaluating (430) the summed output by comparing the summed output with a variable reference, the results of which may be assessed relative to a specified tolerance.

4 Claims, 8 Drawing Sheets

U.S. PATENT DOCUMENTS

| | | | | |
|---|---|---|---|---|
| 5,663,565 | A * | 9/1997 | Taylor | 250/339.11 |
| 5,717,485 | A | 2/1998 | Ito et al. | |
| 5,803,357 | A * | 9/1998 | Lakin | 374/115 |
| 5,839,829 | A | 11/1998 | Litvin et al. | |
| 5,894,126 | A * | 4/1999 | Pompei et al. | 250/338.1 |
| 5,915,295 | A * | 6/1999 | Lauderbaugh | 100/38 |
| 6,026,881 | A * | 2/2000 | Durso | 156/359 |
| 6,061,413 | A * | 5/2000 | Brassart et al. | 376/247 |
| 6,100,527 | A * | 8/2000 | Pompei et al. | 250/339.14 |
| 6,122,420 | A | 9/2000 | Satoh | |
| 6,190,727 | B1 * | 2/2001 | Thaggard | 427/9 |
| 6,196,714 | B1 | 3/2001 | Bellifemine et al. | |
| 6,408,917 | B1 * | 6/2002 | Bett et al. | 156/378 |
| 6,452,180 | B1 * | 9/2002 | Nistler et al. | 250/314.4 |
| 6,461,035 | B1 * | 10/2002 | Meinlschmidt et al. | 374/5 |
| 6,690,016 | B1 * | 2/2004 | Watkins et al. | 250/341.7 |
| 6,854,496 | B1 * | 2/2005 | Ishibuchi et al. | 156/351 |
| 2002/0036047 | A1 * | 3/2002 | Ishibuchi et al. | 156/64 |
| 2002/0166970 | A1 * | 11/2002 | Komulainen et al. | 250/340 |
| 2004/0030514 | A1 * | 2/2004 | Popp et al. | 702/81 |
| 2004/0083958 | A1 * | 5/2004 | Saidman et al. | 118/688 |

FOREIGN PATENT DOCUMENTS

| | | |
|---|---|---|
| DE | 4304343 | 8/1994 |
| EP | 0373332 | 10/1988 |
| EP | 0852333 | 7/1998 |
| JP | 10101028 A * | 4/1998 |
| JP | 10119933 A * | 5/1998 |
| NL | 9401796 | 6/1996 |
| WO | 9634273 | 10/1996 |

OTHER PUBLICATIONS

TH Series Sensor, SUNX Sensors USA, West Des Moines, IA (1 page).

Pending U.S. Appl. No. 09/542,776, Bolger, filed Apr. 4, 2000.

* cited by examiner

HOT MELT ADHESIVE DETECTION METHODS AND SYSTEMS

CROSS-REFERENCE TO RELATED APPLICATIONS

The present application is a continuation-in-part of co-pending U.S. application Ser. No. 10/254,316 filed on 25 Sep. 2002 and entitled "Hot Melt Adhesive Detection Methods And Systems", which is assigned commonly with the instant application and incorporated by reference herein, benefits from which are claimed under 35 U.S.C. § 120.

BACKGROUND OF THE DISCLOSURE

The disclosure relates generally to hot melt adhesive systems, and more particularly to the application and detection of hot materials, for example, hot melt adhesives deposited on substrates, methods and systems therefor.

The non-contact detection of beads of hot adhesives on moving conveyors by using infrared sensors that detect temperature differences between the adhesive and the substrate is known generally.

U.S. Pat. No. 4,831,258 entitled "Dual Sensor Radiation Detector" discloses for example a glue bead detection system comprising a dual sensor housing two thermopiles that detect an adhesive target and the reference moving conveyor temperatures, respectively, through a common lens. The thermopile outputs are coupled to an LED bar graph display that changes with changes between the temperatures of the adhesive target and the moving conveyor. A dynamic bar graph is indicative of intermittent adhesive beads, and a relatively constant bar graph is indicative of a relatively continuous adhesive bead.

In order to precisely detect the beginnings and ends of adhesive beads and other thermal materials, the sensor must be equipped with an optical focusing device, like the common lens in U.S. Pat. No. 4,831,258, but this limits the area that may be monitored by the sensor.

An object of the disclosure is to provide novel thermal detection methods and systems.

Another object of the disclosure is to provide thermal detection methods and systems that improve upon the art.

In one embodiment, the disclosure teaches methods in hot melt adhesive detection systems comprising generally detecting separate areas of a target, for example a hot melt adhesive on a substrate, by sensing changes in temperature with thermal sensors arranged non-parallel to a direction of relative motion between the detector and the target, and summing an output of the at least two thermal sensors. In some embodiments, the summed output of the sensors may be evaluated, for example by comparing the summed output of the at least two thermal sensors with a reference.

In another embodiment, the disclosure teaches methods in thermal detection systems, for example adhesive detection systems, comprising generally generating an output signal related to heat, for example, heat radiating from a hot melt adhesive, detected with a thermal sensor, and evaluating the output signal by comparing it to a threshold generated from a reference heat profile. In one embodiment, the threshold is a variable threshold.

In another embodiment, the disclosure teaches thermal sensing systems, for example hot melt glue sensing systems, comprising at least two thermal sensors mounted in spaced apart relation, a signal summer having inputs coupled to outputs of the at least two thermal sensors, a controller having an input coupled to a output of the signal summer, wherein the controller is programmed to sample and store the output of the summer in memory.

In yet another embodiment, the disclosure teaches thermal sensing systems, for example hot melt glue sensing systems, comprising detecting a product, detecting hot melt glue disposed on the product while detecting the product, and comparing a period during which the product is detected with a period during which the hot melt glue is detected.

These and other objects, aspects, features and advantages of the present disclosure will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE DISCLOSURE

Figure 1:
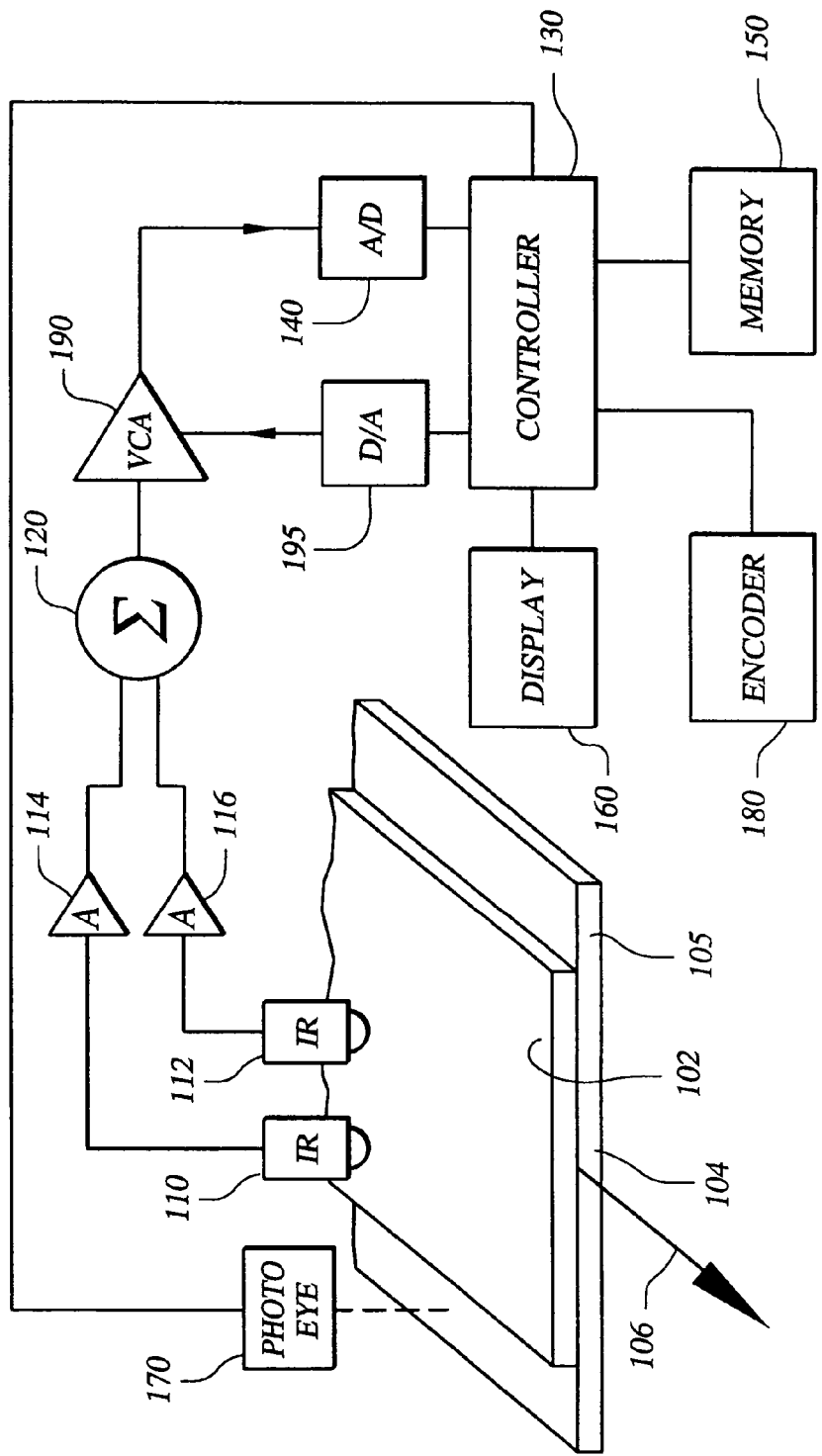
FIG. 1 is a sectional view of an exemplary thermal sensing system for detecting target articles.

FIG. 1 is an exemplary thermal sensing system 100 for detecting target articles, or targets, at temperatures different than ambient temperature, for example, a hot melt adhesive 102 deposited onto a moving substrate or packaging 104 as illustrated in FIG. 1. In other applications, the thermal sensing systems of the present inventions are useful for detecting other substances, other than hot melt adhesives. These and other applications will become more fully apparent to those having ordinary skill in art upon consideration of the exemplary embodiments below.

In one embodiment of the invention, the thermal sensing system comprises generally a plurality of at least two thermal sensors mounted in or on a mounting member, for example, a mounting member positionable relative to the target to be detected by the detectors. The plurality of sensors are preferably oriented non-parallel to a direction of relative motion between the sensors and the target. These and other aspects of the invention are discussed more fully below. The number of sensors depends generally upon the width of the detected target.

In one embodiment suitable for detecting hot melt adhesives and for other sensing applications, the thermal sensors are infrared-heat detecting sensors. The TH Series of infrared thermal sensors, for example, Part Number TH-11, by SUNX Sensors USA, West Des Moines, Iowa 50265, are especially well suited for hot melt glue sensing applications. The TH-11 series hot melt glue sensor includes a controller that stores pre-set programmed settings for different applications and produces a red alignment spot on the target to facilitate alignment and focused detection. Other specialty sensors, a variety of which are available from SUNX Sensors USA and other manufacturers, may be better suited for applications other than hot melt detection.

Although the exemplary plurality of thermal sensors comprise discrete sensors, other embodiments may employ a single sensor capable of detecting more than one location and producing corresponding outputs, which may be summed together as discussed further below. Such a unitary sensor with multiple sensors inputs and corresponding outputs is considered, at least for the present invention, to be equivalent to multiple discrete sensors of the exemplary type.

In FIG. 1, the exemplary sensors 110 and 120 are mounted side-by-side substantially transversely to a direction 106 of substrate movement, thereby enabling the detection of a relatively wide area of the target. In other embodiments, however, the thermal sensors may move relative to a stationary thermal target. In these latter embodiments, the thermal sensors are also disposed non-parallel to the direction of relative motion.

Figure 2:
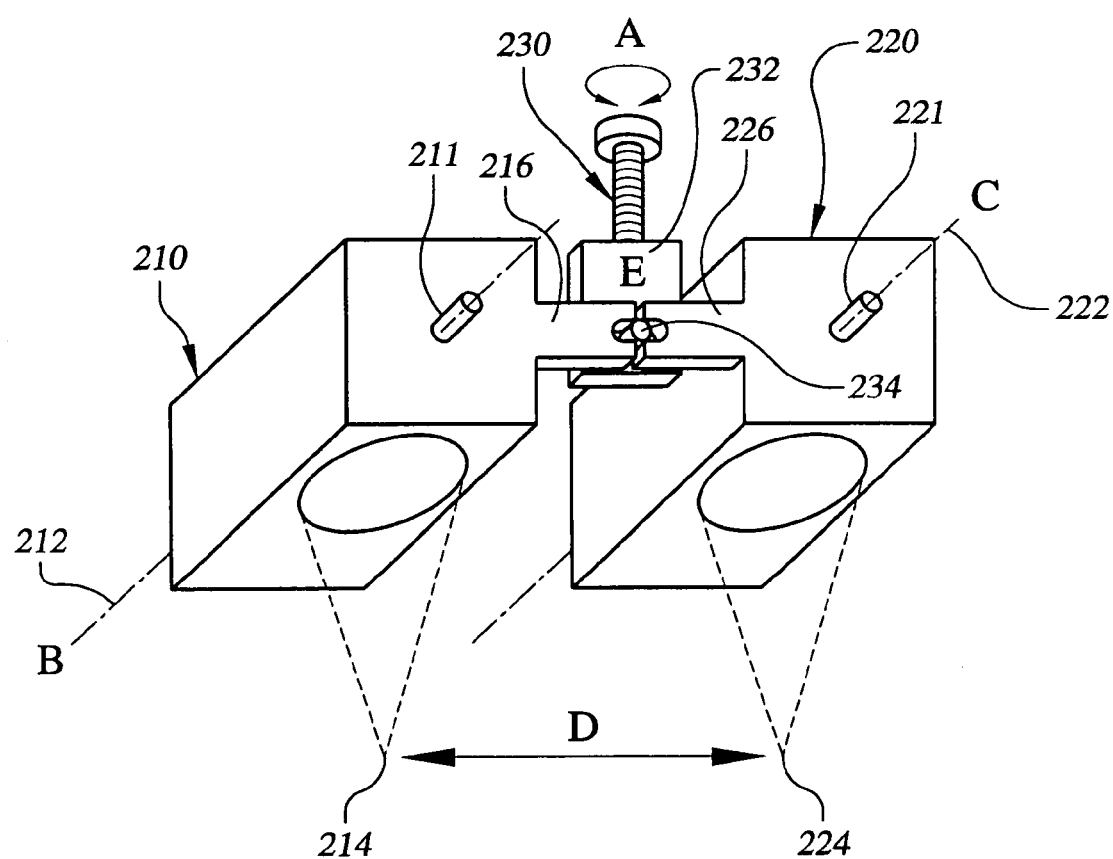
FIG. 2 is an exemplary arrangement of a plurality of adjustable thermal sensors.

FIG. 2 illustrates first and second sensors 210 and 220 pivotally adjustable about corresponding axes 212 and 222, respectively. The pivot axes are substantially parallel to the direction of relative motion between the sensor or sensors and the target, indicated by arrow 106 in FIG. 1. Thus configured, the sensors 210 and 220 are adjustably positionable to change the spacing D between the areas of the target detected by the sensors. In the exemplary illustration, the focus of each of the sensor, 210 and 220, is positionable toward and away from the other, increasing or decreasing the spacing D between the focus points 214 and 224.

In the exemplary embodiment of FIG. 2, the thermal sensors 210 and 220 are pivotally supported on a support member or mounting bracket, not shown, by corresponding pivots 211, 221 extending along the corresponding pivot axes 212 and 222, respectively. In the exemplary embodiment, a lever arm 216, 226 extending from each of the sensors 210, 220 is coupled to a common adjustment member 230 for adjustably pivoting the thermal sensors 210 and 220 about the corresponding pivot axes.

In FIG. 2, the exemplary common adjustment member 230 includes a translating member 232 having an engagement member 234 coupled to the lever arms 216, 226 of the thermal sensors. The engagement member 234 is in the form of a protruding portion movably coupled to the lever arms. In other embodiments, each arm 216, 226 may be coupled to the translating member by a corresponding engagement member. The exemplary translating member 232 reciprocates back and forth, for example, by turning a jack screw 236 threadedly engaged therewith. Reciprocation of the translating member pivots the thermal sensors about the axes 212 and 222, thereby adjusting the distance D between the focal points of the sensors. In other embodiments, the thermal sensors may be adjustable independently. Also, other adjustment apparatuses may be used to orient the thermal sensor relative to the target article.

In FIG. 1, an electrical schematic diagram of an exemplary thermal sensing system 100 comprises generally a plurality of at least two sensors 110 and 112 having outputs coupled to a summer circuit 120. In the exemplary embodiment, the analog outputs of the sensors 110 and 112 are amplified by corresponding amplifiers 114 and 116, respectively, before being input to the adder circuit. In the exemplary system, the summer circuit output is coupled to an input of a digital controller 130, for example, a microcontroller, after digitization by an analog-to-digital converter 140. In other embodiments, additional thermal sensors may be included and the outputs thereof may summed at the same summer 120, or at another summer, and then input to the controller 130.

The micro-controller is coupled to memory 150, including read only memory (ROM) and possibly programmable ROM (PROM) and RAM for storing data. In some embodiments the controller is coupled to a display device 160, for example, a liquid crystal (LCD) display or a cathode ray tube (CRT). In this exemplary embodiment, the controller is programmed, for example, by an application program stored in ROM or in a PROM, to sample the digitized output of the summer 120 and store the sampled summer output data in memory. Those having ordinary skill in the art will appreciate that the exemplary digital implementation herein has analog equivalents.

In some embodiments, it is desirable initially to detect the presence of the product or target to be detected by the thermal sensors. In FIG. 1, a photo-detector 170 trained on the target has an output coupled to the controller 130. In embodiments where the controller is a digital processor, the output of the photo-detector 170 is digitized before being input to the controller.

The exemplary system of FIG. 1 also includes an encoder 180 having an output coupled to an input to the controller. The encoder 180 is, for example, a rotary mechanical encoder or an optical encoder for measuring relative motion between the thermal sensors and the target. This information may be used, for example, to compute the rate at which the target moves relative to the thermal sensors, as discussed more fully below.

Figure 3:
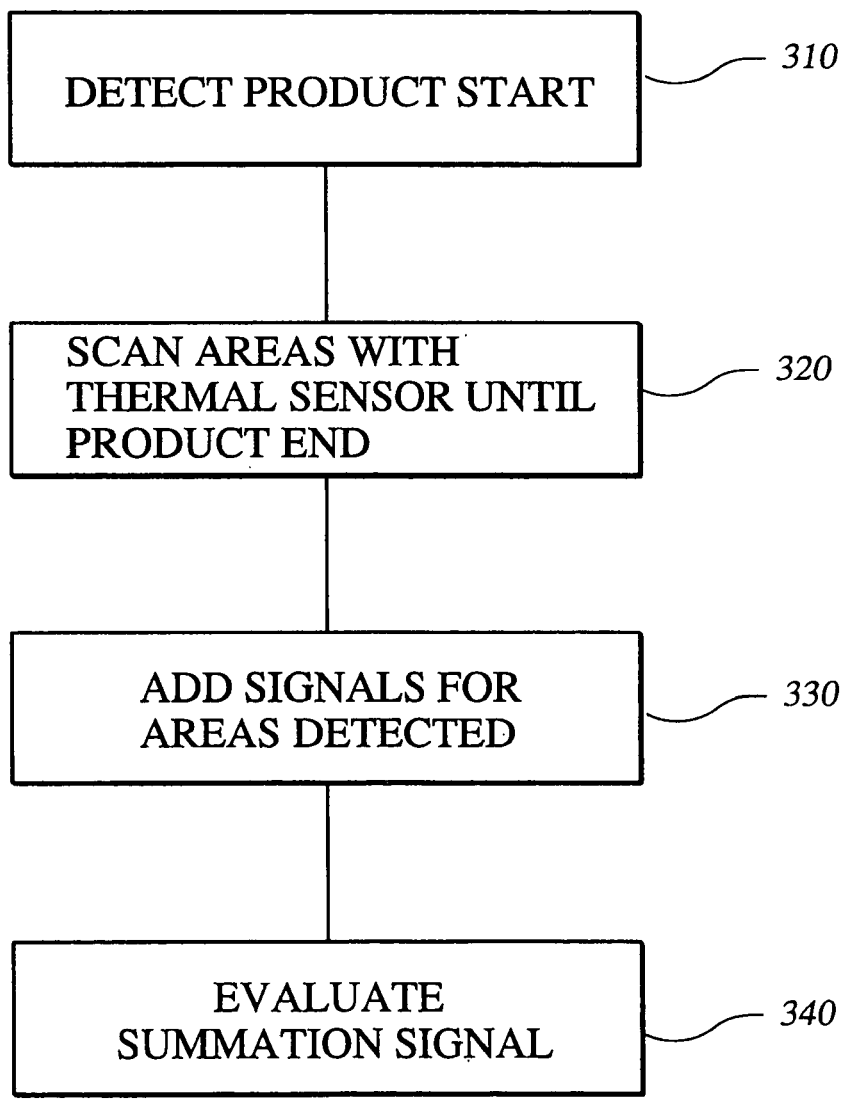
FIG. 3 is an exemplary process flow diagram for sensing articles with thermal sensing systems.

FIG. 3 is an exemplary process flow diagram 300 illustrating generally the operative function of the thermal sensing systems of the present invention. In some embodiments, it is desirable to detect the beginning and end of the product on which the target should be deposited. In FIG. 3, at block 310, this may be performed by detecting the leading edge of the product, and then detecting the trailing edge thereof. In FIG. 1, the leading edge 105 of the exemplary product 104 is detected with the photo-eye 170, which is also capable of detecting the trailing edge thereof.

In some embodiments, detection of the product leading edge may be used to initiate the thermal sensing operation, which is discussed further below. Detection of the trailing edge of the product may be used to terminate the thermal sensing operation. In FIG. 3, at block 320, the product is scanned with the thermal sensors until the trailing edge of the product run is complete, for example, until the trailing edge of the product is detected by the photo-eye 170 in FIG. 1.

In some embodiments, the product leading edge detection event may be stored in memory for use as a reference, for example, relative to the product trailing detection event. Use of encoder outputs that track the movement of the product may be used with the leading and trailing edge detection events to compute the length of the product. The measured product length may then be compared with known product length. The computed product length may also be compared with outputs of the thermal sensors to determine whether the product has been covered adequately by the target material.

In one mode of operation, at least two adjacent areas of the target are detected by the plurality of thermal sensors. As noted above, broader areas may be detected by using additional sensors, or pairs of sensors. In the exemplary embodiment, at least two separate areas of the adhesive material are detected by sensing changes in temperature with a corresponding number of thermal sensors arranged non-parallel to a direction of relative motion between the detector and the adhesive material. The thermal sensors generally detect the target material, for example, the hot melt adhesive of FIG. 1, by detecting the target at a temperature relative to the area around the target. The thermal sensors thus produce electrical signals corresponding to changes in temperature at two separate locations along the target.

In FIG. 3, at block 330, the output signals of the at least two sensors scanning the moving target are summed or added together. In FIG. 1, the amplified analog output of the sensors is added at the summer 120. In FIG. 1, the digitized output of the summer circuit is sampled by the controller and stored in memory. In the exemplary digital implementation, the sampling and storage of the summed sensor signal is performed by a sampling application program segment, stored in memory.

In some embodiments, it is desirable to sample the summed output at a rate dependent on the relative motion between the detector and the adhesive material, thus sampling the summation of the sensor outputs at regular distance intervals along the target. In one embodiment, illustrated in FIG. 1, the encoder 180 measures the relative motion between the sensor and the target for use by the controller to schedule sampling of the summer output at some desired fixed spacing. The sampled data is stored in RAM, for example, in a tabular form.

Figure 4:
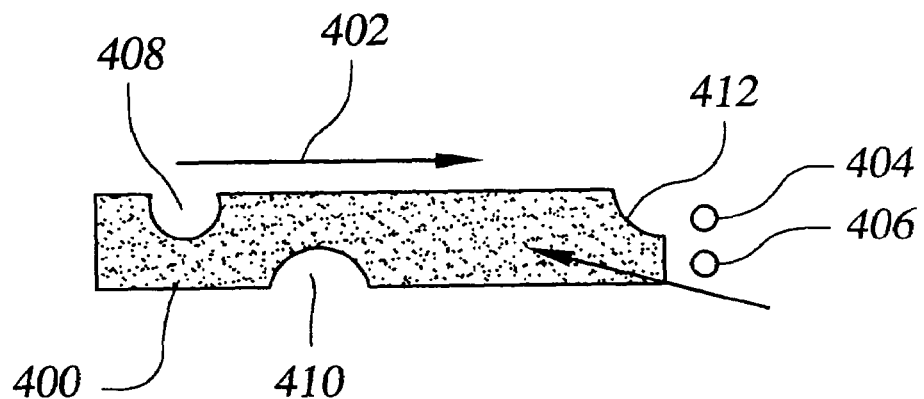
FIG. 4 is an exemplary target and thermal sensor configuration.

In FIG. 4, at block 340, the output of the summer circuit is evaluated, for example, by comparing the summed output of the at least two thermal sensors with a reference. In one embodiment, a reference is establish empirically by taking measurements devoid of hot melt adhesive and in other areas covered by adhesive. The reference will be somewhere between low and high measurements, depending upon the requirements of the particular application, as discussed further below.

Upon establishing the reference, the sampled summer output data are compared relative to the reference by counting how many readings are above or below the reference, for example, on a per unit length basis, and then assessing the compared results relative to a tolerance, which may also be determined empirically. In the exemplary embodiment, the comparison is controlled by a comparison program segment, stored in memory, that compares stored samples of the summation of at least two thermal sensor signals with a stored reference.

FIG. 4 illustrates an exemplary hot melt glue target 400 moving in a direction 402 relative to thermal sensors 404 and 406, the outputs of which are summed, sampled and stored as discussed above. The glue target includes voids 408, 410 and 412 where glue was not deposited, for example, due to an obstructed glue nozzle or for some other reason.

Figure 5:
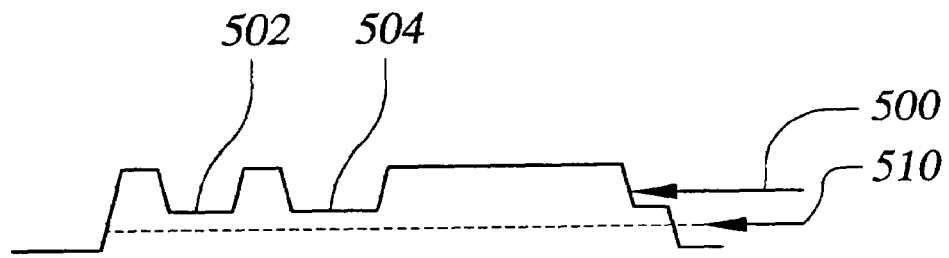
FIG. 5 is a graphical representation of a summed sensor signal plotted relative to a reference signal.
Figure 6:
FIG. 6 is a plot of a signal indicative of results of the comparison of the summed signal with the reference signal of FIG. 5.

FIG. 5 is a graphical illustration of a summed sensor output signal 500 corresponding to the summed outputs of sensors 404 and 406 in FIG. 4. The glue voids 408, 410 and 412 in FIG. 4 reduce the amplitude of the summation signal 500 in FIG. 5. FIG. 5 also illustrates a reference or threshold level 510, against which the signal 500 is compared. In FIG. 5, the reference is chosen so that the signal 500 will exceed the reference as long as at least one of the two thermal sensors detects glue at any given time. FIG. 6 illustrates a comparison output 600 that is high when the signal 500 in FIG. 5 exceeds the reference 510. The comparison output 600 in FIG. 6 is low when the signal 600 does not exceed the reference 510 in FIG. 5.

Figure 7:
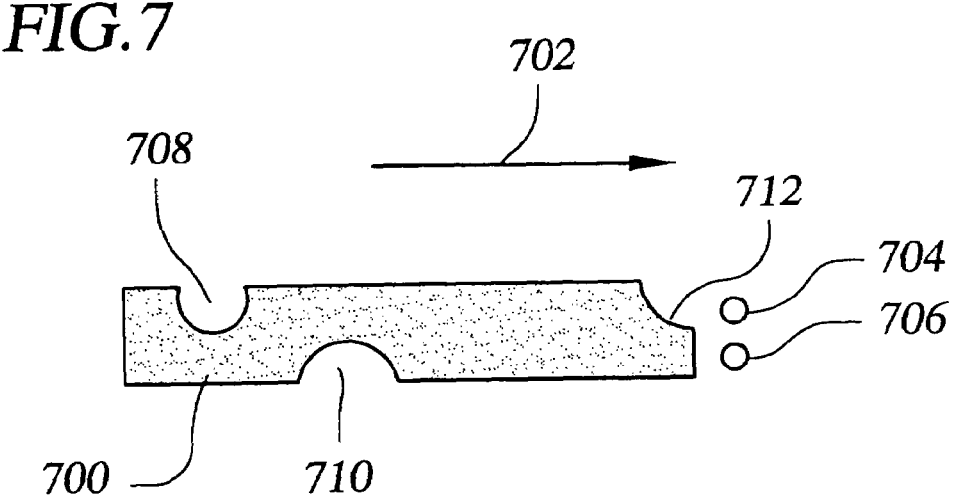
FIG. 7 is another exemplary target and thermal sensor configuration.

FIG. 7 illustrates another exemplary hot melt glue target 700 moving in a direction 702 relative to thermal sensors 704 and 706, the outputs of which are summed, sampled and stored as discussed above. The glue target also includes voids 708, 710 and 712 where glue is not deposited.

Figure 8:
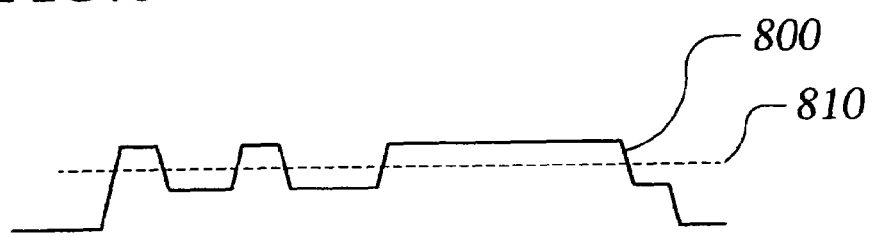
FIG. 8 is a graphical representation of a summed sensor signal plotted relative to a different reference signal.
Figure 9:
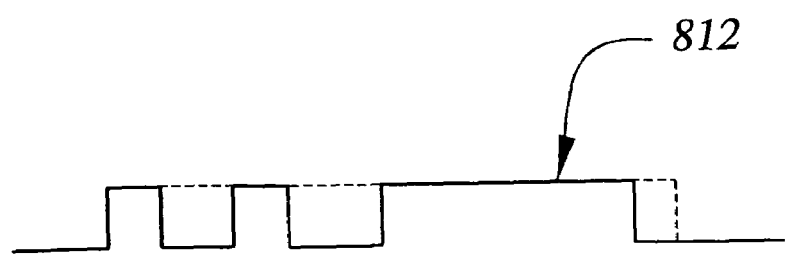
FIG. 9 is a plot of a signal indicative of results of the comparison of the summed signal with the reference signal of FIG. 8.

FIG. 8 is a graphical illustration of a summed sensor output signal 800 corresponding to the summed outputs of sensors 704 and 706 in FIG. 7. The glue voids in FIG. 7 reduce the amplitude of the summation signal 800 in FIG. 8. FIG. 8 also illustrates a reference or threshold level 810, against which the signal 800 is compared. In FIG. 8, the reference is chosen so that the signal 800 will exceed the reference only when both sensors detect glue at the same time. If either one of the two sensors does not detect glue, the summed signal 800 drops below the reference 810. FIG. 9 illustrates a comparison output 812 that is high when the signal 800 in FIG. 8 exceeds the reference 810. The comparison output 812 in FIG. 9 is low when the summed signal 800 does not exceed the reference 810.

Figure 10:
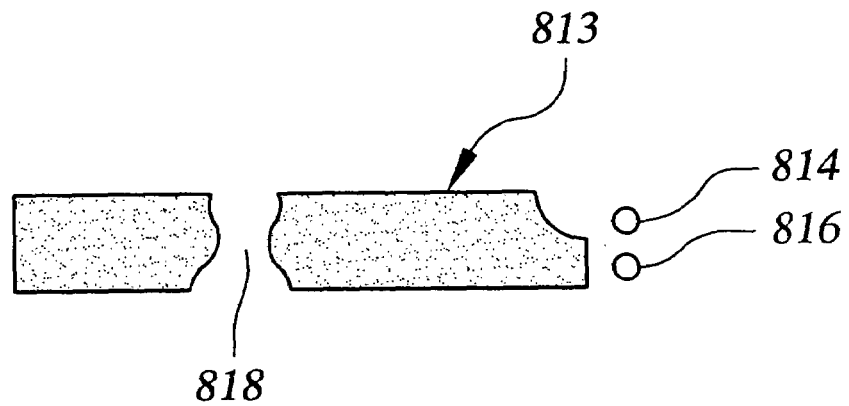
FIG. 10 is another exemplary target and thermal sensor configuration.

FIG. 10 illustrates another exemplary hot melt glue target 813 moving in a direction 815 relative to thermal sensors 814 and 816, the outputs of which are summed, sampled and stored as discussed above. The glue target includes a discontinuity 818, where glue is not deposited, extending across the target area in the path of both sensors 814 and 816.

Figure 11:
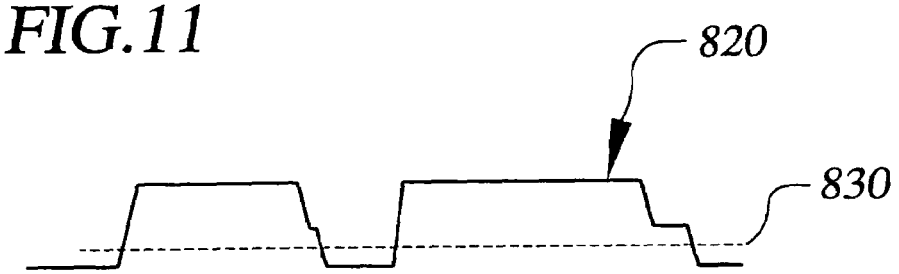
FIG. 11 is a graphical representation of a summed sensor signal plotted relative to a different reference signal.
Figure 12:
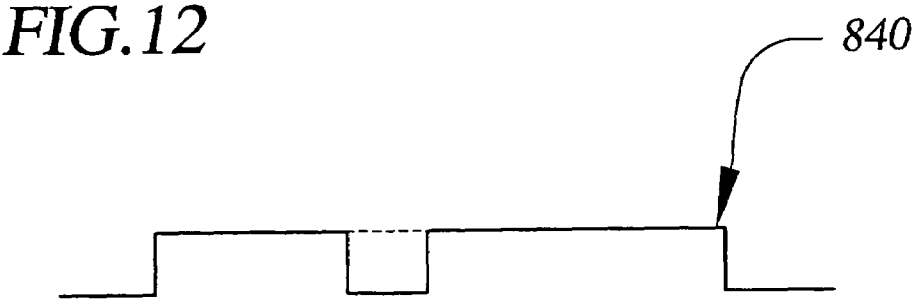
FIG. 12 is a plot of a signal indicative of results of the comparison of the summed signal with the reference signal of FIG. 11.

FIG. 11 is a graphical illustration of a summed sensor output signal 820 corresponding to the summed outputs of sensors 814 and 816 in FIG. 10. The glue void 818 in FIG. 10 reduces the amplitude of the summation signal 820 in FIG. 11. FIG. 11 also illustrates a reference or threshold level 830, against which the signal 820 is compared. In FIG. 11, the reference is chosen so that the signal 820 will exceed the reference when at least one sensor detects glue. However, if both sensors fail to detect glue, the summed signal output 820 drops below the reference 830. FIG. 12 illustrates a comparison output 840 that is high when the signal 820 in FIG. 11 exceeds the reference 830. The comparison output 840 in FIG. 12 is low when the summed signal 820 does not exceed the reference 830.

In the exemplary embodiments, all amplitude data points of the summed thermal signal outputs are not stored. Instead the summed signal is sampled and stored for comparison with the corresponding references. In one embodiment, a tolerance establishes the acceptable number of signal samplings that may not exceed the reference on a per unit length basis. In hot melt glue applications, the results of the sensor signal evaluation may be used to determine whether an adequate amount of glue has been deposited. In the exemplary digital implementation, a tolerance program segment stored in memory compares the results of the comparison program segment with a user specified tolerance.

In one embodiment, a product on which the target is disposed is detected, for example, with a photo-detector that detects the leading and trailing edges thereof. A hot melt glue, or other target, disposed on the product is also detected while detecting the product. It may be determined whether the hot melt glue completely coats the product by comparing a period during which the product is detected with a period during which the hot melt glue is detected. Additional information may be obtained about the application of the adhesive on the product by also using the encoder, for example, a determination may be made regarding which portions of the product are coated with adhesive and which ones are not.

In one embodiment, the reference is determined while operating the system in a teach mode. In teach mode, upon establishing stable thermal sensor readings, the controller successively adjusts the gain of the summer signal output, or other detector output, to optimize the span of temperature readings. The gain of the output may also be adjusted in teach mode to adapt to different target conditions, for example, different temperature output ranges or adhesive glue thickness, etc. For this adjustment, the controller increases or decreases the amplifier gain based on the maximum temperature readings, thus shifting the range of readings to a more optimal range, for example, to better differentiate temperature readings from noise. In FIG. 1, a variable gain amplifier 190, for example a voltage controlled amplifier, coupled to the output of the summer 120 is adjusted by the controller 130, via a digital to analog (D/A) converter 195 during teach mode operation.

Figure 13:
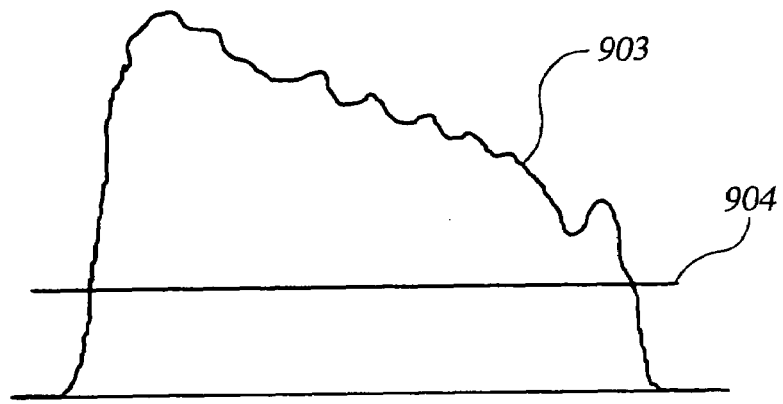
FIG. 13 is an exemplary reference heat profile.

In one embodiment, the reference is a linear threshold. FIG. 13 illustrates an exemplary heat profile 903, which slopes downwardly, but more generally the heat profile may have a positive or other variable slope. In FIG. 13, the exemplary linear threshold 904 is constant. The threshold level may be increased or decreased generally, but it must be set below the lowest portion of the heat profile for which detection is desired. In FIG. 13, the level of threshold 904 is established by the lower portion of the heat profile 903, on the right-hand side thereof. The reference, or threshold, is preferably established by detecting a known good product that will produce an acceptable heat profile, from which the threshold may be established in teach mode. The heat profile 903 in FIG. 13 is such a profile, referred to herein as a reference heat profile.

Figure 14:
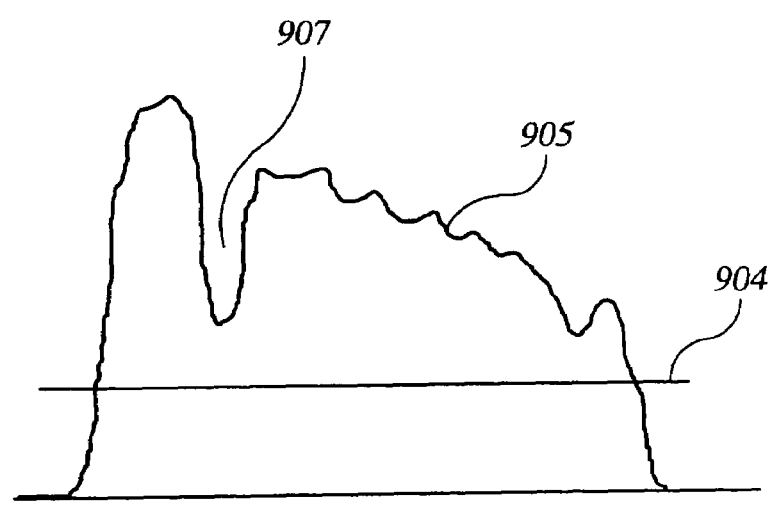
FIG. 14 is an exemplary distorted heat profile.

FIG. 14 illustrates a distorted heat profile 905, typical of that which may be detected on a product. The distortion in the heat profile of FIG. 14 is characterized by a dipping void 907, which may be indicative of less than adequate adhesive coverage or some other defect depending upon the target detected. In FIG. 14, however, since the constant threshold 904 is set relatively low, the distortion 907, which may correspond to an undesirable defect, is undetectable.

Figure 15:
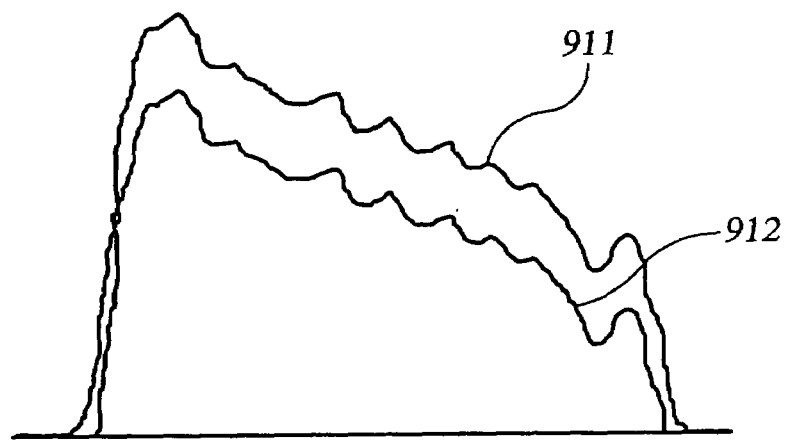
FIG. 15 is an exemplary threshold generated by scaling a reference heat profile.

For some applications, a constant linear threshold discussed above is acceptable. In other applications, however, it may be more desirable to have a threshold that corresponds more closely to a desired heat profile, which may be non-constant or variable. FIG. 15 illustrates a reference heat profile 911 and an exemplary non-linear threshold 912 that generally follows the variable ideal profile, but with a lesser magnitude. Alternatively, the threshold may be an approximation, as discussed, for example, a mathematical approximation.

In FIG. 15, the exemplary threshold 912 is generated by scaling the reference heat profile 911 detected when the system is in teach mode, as discussed above. In FIG. 15, for example, the sampled readings of the heat profile 911 are reduced by some percentage, for example, 10 percent. In one embodiment, the reference profile is created by sampling a known good product, for example, an ideal glue deposit on a substrate, over time or distance intervals. The sampled data is stored in memory, for example, in memory 150 in FIG. 1. The threshold 912 is generated by subtracting a portion from each datum of the sampled data, resulting in a threshold that is proportionately less than the reference heat profile 911, as illustrated in FIG. 15

In some embodiments, the amount subtracted is dependent upon the slope of the reference heat profile. In other embodiments, the amount subtracted depends upon the expected variability of the product measured. Thus in some applications, it may not be necessary to scale the reference profile, whereas in other applications substantial scaling of the reference heat profile may be required.

Figure 16:
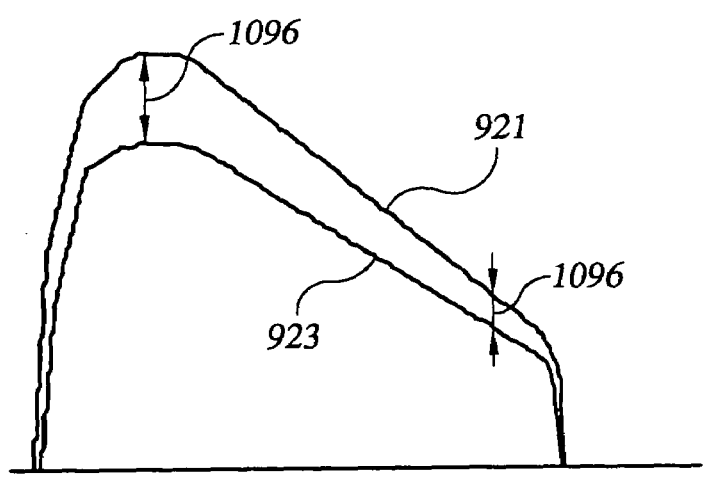
FIG. 16 is another exemplary threshold generated by scaling a reference heat profile.

In some embodiments, the reference profile may be generated from multiple profiles, for example, by averaging data samples from several profiles, which may have small variations. FIG. 16 illustrates an averaged reference heat profile 921, which may be sampled periodically. The threshold 923 corresponds is determined by scaling the reference profile, for example, by subtracting some quantity from samplings of the reference profile 921.

While the foregoing written description of the invention enables one of ordinary skill to make and use what are considered presently to be the best modes thereof, those of ordinary skill will understand and appreciate the existence of variations, combinations, and equivalents of the specific exemplary embodiments herein. The inventions are therefore to be limited not by the exemplary embodiments herein, but by all embodiments within the scope and spirit of the appended claims.

What is claimed is:

1. A hot melt adhesive sensing system, comprising:
    a plurality of thermal sensors disposed in spaced apart relation;
    a signal summer coupled to the plurality of thermal sensors;
    a controller coupled to the signal summer,
    the controller for sampling an output signal of the signal summer, and the controller for comparing the sampled output signals of the signal summer to a variable threshold,
    the controller for determining the number of sampled output signals of the signal summer less than the variable threshold.

2. A hot melt adhesive sensing system, comprising:
    a plurality of thermal sensors disposed in spaced apart relation for sensing a target material on a substrate;
    a signal summer coupled to the plurality of thermal sensors;
    a controller for sampling an output of the signal summer and comparing sampled output signals of the signal summer to a variable threshold,
    the controller for determining a number of sampled output signals of the signal summer less than the variable threshold, and the controller for evaluating number of sampled output signals of the signal summer relative to a predefined tolerance.

3. A hot melt adhesive sensing system, comprising:

at least two thermal sensors mounted in spaced apart relation, each of the at least two sensors having a signal output;

a signal summer, the signal summer having signal inputs coupled to the signal outputs of the at least two thermal sensors, the signal summer having a signal output;

a controller having a signal input coupled to the signal output of the signal summer, memory coupled to the controller, a variable threshold stored in memory;

the controller programmed to sample an output signal of the signal summer and store the sampled output signal in the memory, the controller programmed to compare the sampled output signals of the signal summer to the variable threshold, the controller programmed for determining the number of sampled output signals of the signal summer less than the variable threshold.

4. The hot melt adhesive sensing system of claim 3, the controller is programmed to evaluate the number of sampled output signals of the signal summer relative to a predefined tolerance.

\* \* \* \* \*